Feb. 27, 1940. T. E. PURCELL ET AL 2,191,728
FLUID SUPPLY HOSE AND REEL MEANS
Original Filed Sept. 17, 1935 3 Sheets-Sheet 2
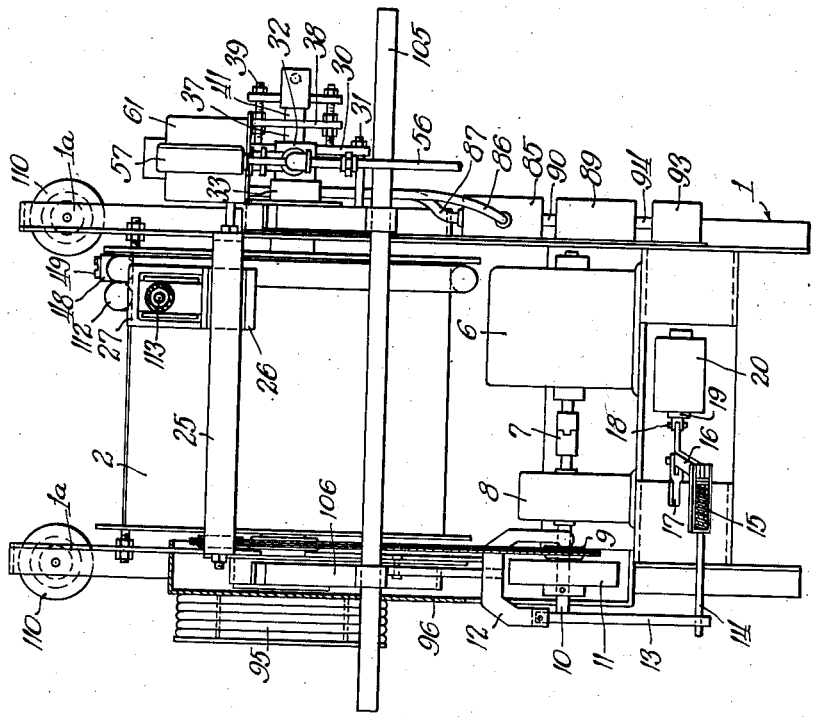
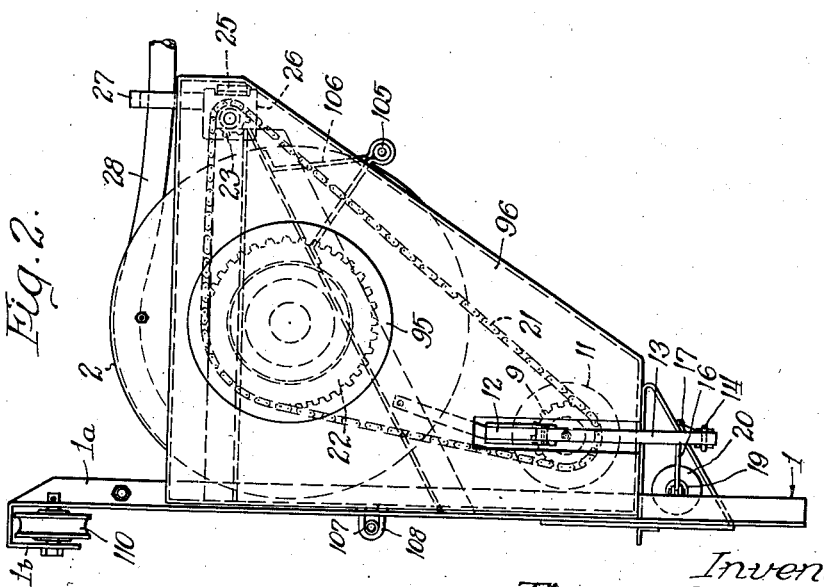
Inventors:
Thomas E. Purcell,
Ira E. Church.

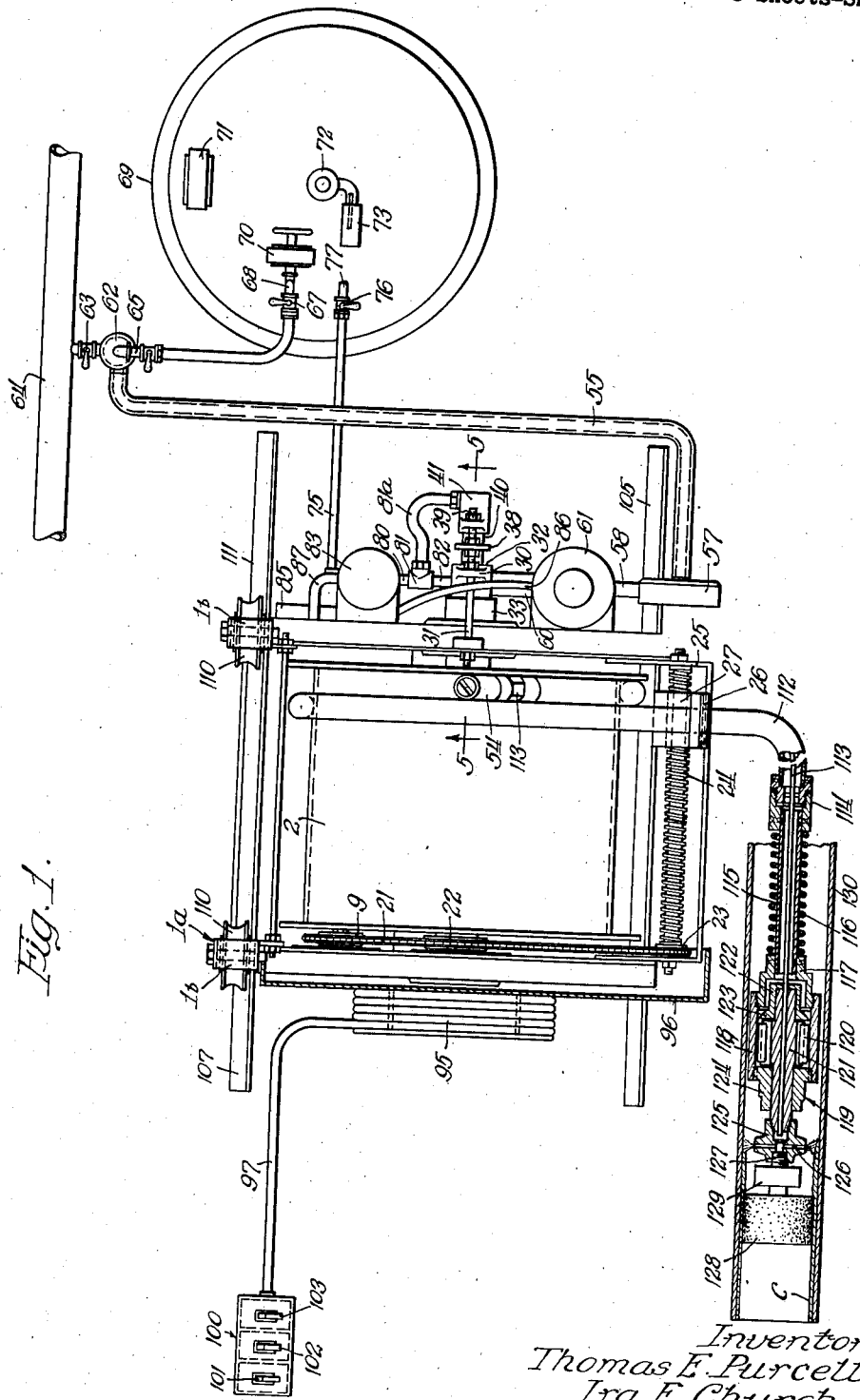

Feb. 27, 1940.   T. E. PURCELL ET AL   2,191,728
FLUID SUPPLY HOSE AND REEL MEANS
Original Filed Sept. 17, 1935    3 Sheets-Sheet 3
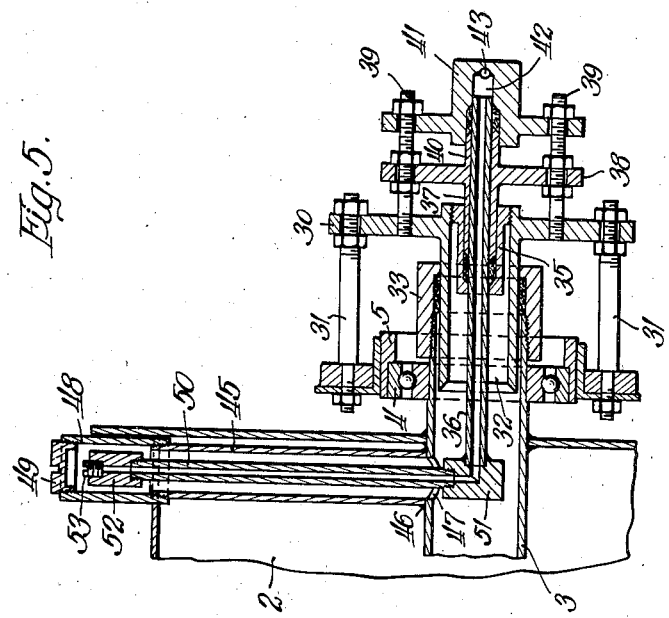
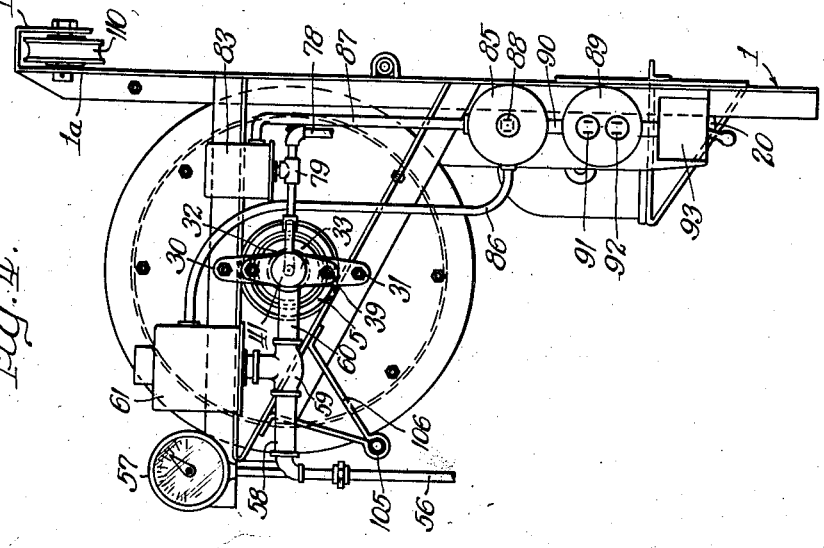
Inventors:
Thomas E. Purcell,
Ira E. Church.
By
Attys.

Patented Feb. 27, 1940

2,191,728

UNITED STATES PATENT OFFICE 2,191,728

FLUID SUPPLY HOSE AND REEL MEANS

Thomas E. Purcell, Mount Lebanon, and Ira E. Church, Bethel Township, Allegheny County, Pa.

Original application September 17, 1935, Serial No. 45,250. Divided and this application February 14, 1938, Serial No. 190,470

3 Claims. (Cl. 299—78)

This invention relates to the coating of tubes and analogous articles with liquids, such as corrosion resting paints, and has to do with improved means for supplying the coating material to the tubes.

Our invention is directed to the application to a tube of a coating material in a coat of predetermined uniform thickness effective to protect the tube. An object of our invention is to provide means whereby the coating material is supplied to the surface of the tube to be coated at a predetermined uniform rate and is spread uniformly upon the tube surfaces at a uniform rate so related to the rate of supply of the material as to assure distribution of the latter upon the tube surface in a continuous coating of uniform predetermined thickness. A further object is to provide simple, efficient, and comparatively inexpensive means of the character stated. Further objects and advantages of our invention will appear from the detail description.

In the drawings:

Figure 1 is a plan view of a machine embodying our invention, this view also showing a boiler tube fragmentarily and in section being coated by our machine, parts of the machine being broken away and shown in section;

Figure 2 is a side view of the machine, parts being omitted for clearness of illustration;

Figure 3 is a front view of the machine, parts being omitted for clearness of illustration;

Figure 4 is a side view of the machine, taken from the side opposite to that of Figure 2, parts being broken away and omitted for clearness of illustration;

Figure 5 is a fragmentary sectional view taken substantially on line 5—5 of Figure 1, parts being omitted for clearness of illustration, on an enlarged scale.

This application is a division of our copending application for Tube coating means, Serial No. 45,250, filed October 16, 1935, patented on March 28, 1938, Patent No. 2,112,212.

The machine of our invention comprises a suitably braced angle iron frame 1 in which is rotatably mounted a reel 2 comprising a central shaft 3 mounted at each end in ball bearings 4 carried by a collar 5 suitably supported in the frame.

A constant speed electric motor 6 of known type is suitably mounted in the lower portion of frame 1 and has driving connection, by means of a flexible coupling 7 of known type, to a gear reduction unit 8, also of known type, mounted in the lower portion of the frame. A sprocket wheel 9 is loosely mounted upon shaft 10, which projects outward from unit 8, this sprocket wheel being disposed adjacent a friction clutch member 11 secured upon shaft 10, it being understood that sprocket 9 is provided with a clutch member which cooperates with member 11, the two friction members of the clutch being yieldingly urged out of contact with each other. Friction clutches of this type are known and need not be further illustrated nor described here. A clutch fork 12 of approximately inverted U-shape extends over the clutch member 11 and has its inner arm provided, at the lower end thereof, with fingers disposed at opposite sides of shaft 10 and contacting the sprocket 9 at the inner side thereof. The outer arm of fork 12 is provided, at its lower end, with a socket in which is secured the upper end of a lever 13 suitably mounted for rocking movement on the outer end of shaft 10. A pull rod 14 has its outer end suitably attached to the lower end of lever 13 and is connected at its inner end, through the medium of a yielding connection 15 of known type, to the forward end of one arm of a bell crank lever 16 pivotally mounted in a bracket 17 secured to the frame 1. The other arm of lever 16 is suitably connected, at 18, to movable core 19 of an electromagnet 20 suitably mounted upon frame 1. When the electromagnet is energized, yoke 12 is moved in proper direction to force the sprocket wheel 9 toward the left, as viewed in Figure 3, thus clutching the sprocket wheel to shaft 10, through the medium of the friction clutch, so as to rotate therewith, and when the electromagnet 20 is deenergized yoke 12 is released and the sprocket wheel is declutched from the shaft.

A sprocket chain 21 is trained about sprocket wheel 9 and passes over a sprocket wheel 22 secured upon shaft 3 adjacent the lefthand end of reel 2, as viewed in Figure 3, this chain passing forward and downward about a sprocket wheel 23 secured upon the lefthand end of a screw shaft 24 rotatably mounted in a U-shaped bracket 25 suitably secured to, and extending forward from, the upper portion of frame 1. Shaft 24 threads through a block 26 provided in its forward face with a guideway which receives the bight portion of bracket 25. A rectangular guide element 27 projects upward from block 26 and serves to guide a flexible hose 28 passing through the guide element, during winding of the hose onto and off of the reel 2. During rotation of the reel, screw shaft 24 will also be rotated and acts to feed the guide member lengthwise of the reel at a rate commensurate with the rotation thereof and such as to assure proper positioning of the convolutions of the hose as it is wound onto or off of the reel. The hose guide means is, in general, of known type, and need not be described in greater detail. Preferably, the guide element 27 is provided with suitably disposed rollers, or equivalent means, known in the art, for guiding the hose and facilitating passage thereof through the guide element.

The righthand end portion of shaft 3 is of tubular construction or, if desired, this shaft may be of tubular construction throughout its length and many be provided, adjacent its righthand end, with a suitable plug or closure member. A plate 30 is suitably secured to frame 1, as by means of shouldered bolts 31 and associated nuts, and carries a sleeve 32 which extends into the righthand end of shaft 3, this sleeve being open at its inner end, as shown in Figure 5. A packing nut 33 is screwed upon the end of shaft 3 and serves to compress between the end of this shaft and about sleeve 32 suitable packing material, thus providing a stuffing box at the end of shaft 3 and about sleeve 32 effective to prevent leakage of air from the end of the shaft while permitting rotation thereof in the rotation of the reel. A packing gland 35 is screwed into the outer end of sleeve 32 and serves as a closure therefor. A tube 36 passes through the inner end of packing gland 35 and extends outward therefrom through a sleeve 37 projecting from the inner side of the plate 38 adjustably secured by bolts 39 and associated nuts, to plate 30. Plate 38 is also provided, at its outer side, with a short sleeve 40 disposed coaxial with and forming a continuation of sleeve 37, the outer portion of sleeve 40 extending into the inner end of a flanged head 41 adjustably secured by bolts 39 and associated nuts to plate 38. Tube 36 extends through sleeves 37 and 40 and projects into a reduced bore 42 formed in the outer portion of head 41 coaxial therewith. Head 41 is further provided, adjacent its outer end, with a duct 43 extending radially of the head from bore 42. Suitable packing material is confined between the inner end of sleeve 37 and the inner end of gland 35, about tube 36, and suitable packing material is also confined within head 41 about tube 36 and between sleeve 40 and the inner end of the recess in head 41 which accommodates this sleeve. In this manner, we provide suitable stuffing boxes about the tube 36 effective to form fluid tight closures about this tube while permitting rotation thereof in the rotation of the reel, it being noted that tube 36 is disposed coaxial with shaft 3.

A tube 45 is welded at its inner end, at 46, to shaft 3 about an opening 47 in this shaft. Tube 45 extends radially from shaft 3 and receives upon its upper end a cylindrical head 48 which fits snugly through a corresponding opening in the circumferential wall of the reel, which head screws upon the outer end of tube 45 and is normally closed, at its outer end, by a screw plug 49. A tube 50 is disposed in tube 45 coaxially therewith and is connected, at its inner end, to the inner end of tube 36 by means of a suitable fitting 51. A head 52, disposed within head 48, screws upon the outer end of tube 50 and is normally closed at its outer end by a screw plug 53. A nipple 54 projects radially from head 48 and a similar nipple (not shown) projects from head 52 within and concentric with nipple 54. This provides means whereby air, under pressure, may be supplied to head 48, through sleeve 32, the tubular end portion of shaft 3 and tube 45, and liquid under pressure may be supplied to head 52 through tube 50, fitting 51, and tube 36.

An air supply line 55, conveniently a suitable length of flexible hose, is connected at one end to the lower end of an air pipe 56 disposed adjacent the righthand end of the machine, as viewed in Figure 1. An air gauge 57 is connected to the the upper end of pipe 56, and this pipe is connected by a nipple 58 to a valve casing 59 connected by a nipple 60 to sleeve 32 outwardly beyond the packing nut 33. The valve casing 59 accommodates the valve element of an electromagnetically operated valve indicated in its entirety by reference number 61, this valve being of known type and normally closed. The other end of air line 55 is connected to the outlet of an air cleaner 62 of known type, the inlet of which is connected by a valved connection 63 to an air manifold 64 to which air is supplied in a suitable manner, the air in this manifold being maintained at a predetermined pressure, preferably approximately 80 pounds per square inch. The air cleaner is also provided with a valved outlet connection 65 to which is connected one end of an air conduit 66, conveniently in the form of a suitable length of flexible hose, the other end of which conduit is connected to a valved connection 67 attached to one end of the head of a T fitting 68, the stem of which is secured in and opens through the top of a closed tank 69. An air pressure regulator 70, of known type, is connected to the other end of the head of the T fitting 68 and may be adjusted for maintaining a constant predetermined pressure within the tank 69. The tank 69 is further provided with an air pressure gauge 71, of known type, and with an agitator 72 operated by an air motor 73 which may receive air under pressure from the tank, the agitator and the air motor being of any suitable or preferred known type. The tank 69 is intended to contain a suitable quantity of a coating liquid.

A paint or liquid supply line 75, conveniently in the form of a suitable length of flexible hose, is attached at one end, by means of a valved fitting 76, to the upper end of a tube 77, which is secured through the top of tank 69 and extends downward within the latter an appropriate distance for supplying the coating liquid or paint within tank 69 to the line 75 under predetermined uniform pressure. The other end of line 75 is connected to the lower end of a vertical pipe 78, the upper end of which is connected to one end of a valve casing 79, the other end of which is connected by a nipple 80 to a T 81 at one end of the head thereof. The other end of head of T 81 has secured therein one end of a short rod 82, the other end of which is suitably secured in sleeve 32 to provide a support for the valve casing 79 and associated parts, it being noted that the rod 82 is closed to the T 81. T 81 is connected, by a flexible tube or conduit 81a and associated fittings, to duct 43 of head 41.

Valve casing 79 receives the valve element of an electromagnetic valve 83 of known type, the valve element of which is normally in closed position. An outlet box 85 is mounted upon frame 1 adjacent pipe 78 and is connected by conduits 86 and 87 to the electromagnetic valve 61 and 83, respectively. The outlet box 85 carries a socket member 88 of known type adapted for reception of the prongs of a plug cap, also of known type, which is connected to one end of a multiple control circuit cable to be hereinafter referred to.

A second outlet box 89 is disposed below box 88 and connected thereto by a nipple 90. Outlet box 89 is provided with a socket member 91 adapted for reception of the prongs of a plug cap connected to one end of a cord or cable of an extension light. Box 89 is also provided with a socket member 92 adapted for reception of the prongs of a plug cap connected to one end of an electric cord or cable which is connected to a suitable source of electrical energy. A manually operated cut-out switch 93, of known type, is disposed below the outlet box 89 and is connected thereto by a nipple 94, this switch providing means for manually controlling the circuit of motor 6. It will be understood that electrical conductors or wires, suitably insulated, pass through the conduits 86 and 87 and the nipples 90 and 94, and that suitable connections are made to provide circuits for controlling the valves 61 and 83 and the clutch by means of the electromagnet 20.

A reel 95 is rotatably mounted upon a plate 96 of rectangular cross-section suitably secured to frame 1 at the other end thereof, that is, at the lefthand end of the frame as viewed in Figure 1. Reel 95 receives a flexible electric cord or cable 97 which is windable onto and off of the reel, the latter being of known type and, if desired, having associated therewith spring or equivalent means, also of known type, for rotating the reel and winding the cable thereon as desired. Cable 97 is provided, at one end, with a multiple pronged plug cap adapted for insertion into socket member 88 of outlet box 85 for properly connecting the cable to the control circuits for operating the valves 61 and 83 and the clutch, the latter being actuated in accordance with energizing and deenergizing of the electromagnet 20. It will be understood that the reel 95 is of appropriate structure and has associated therewith suitable means for permitting rotation of the reel in the winding and unwinding of cable 97 without interfering with the connection between the cable and socket member 88. Reels of this type, and having means of the character referred to associated therewith, are known in the art and need not be shown nor described in detail, it sufficing to note that the reel 95 and associated parts and the cable 97 are of suitable type and are associated in such manner as to accomplish the desired results.

A switch block 100, of known type, is connected to the other end of cable 97 and carries three switches 101, 102 and 103, also of known type, these switches preferably being snap switches. Switch 101 may control the circuit of the electromagnetic valve 61, switch 102 may control the circuit of electromagnetic valve 83, and switch 103 may control the circuit of electromagnet 20. By operating the switches in the order named, air under pressure may be admitted to tube 45, coating liquid or paint under predetermined uniform pressure may be admitted to tube 50, and electromagnet 20 may then be energized for rotating the reel 2.

Frame 1, in side view, is of generally triangular shape. A rod 105 extends transversely of the frame, at the front thereof, this rod being suitably secured in brackets 106 welded or otherwise suitably secured to the side members of frame 1. A similar rod 107 is secured by U-bolts 108 to uprights 1a of frame 1 at the rear thereof. Rods 105 and 107 are disposed in parallel relation and project beyond the sides of the frame, providing handles for transporting the machine. The upper end portion of each upright 1a of the frame 1 is turned rearward and downward to provide a U-shaped bracket 1b in which is rotatably mounted a grooved roller 110. The rollers 110 are intended to fit upon a cylindrical rail 111 supported in a suitable manner, for supporting the machine in desired position.

An air hose 112 is attached at one end, by a coupling 113 of known type, to nipple 54 extending from head 48 on the outer end of tube 45. A flexible paint or liquid supply hose 113, of small exterior diameter relative to the interior diameter of hose 112, is disposed in the latter hose and is suitably secured at one end to the nipple extending from head 52 within nipple 54. The other end of air hose 112 is connected, by a coupling 114 of known type, to one end of a tubular connecting member 115 about which extends a reenforcing coil 116 secured at one end to the female member of the coupling 114 and, at its other end, to a coupling head 117 secured to the other end of tubular member 115. Head 117 screws into one end of casing 118 of an air turbine 119 of known type. This turbine includes a rotor 120 provided with a tubular hub 121. This hub projects beyond one end of the rotor into a cup-shaped element 122 of air inlet member 123, the latter being provided with suitably disposed air inlet passages to the rotor. Hub 121 projects beyond the other end of rotor 120, through and beyond a head 124 screwed into the other end of casing 118 of the turbine. The end of hub 121 disposed outward beyond head 124 is exteriorly threaded for reception of the neck of a hollow coupling member 125 screwing onto hub 121. This coupling member is provided with radially disposed outlet passages 126 of predetermined size, according to the characteristics of the liquid or paint used. Coupling member 126 is bored and threaded from its other end for reception of the threaded stem 127 of a cylindrical brush 128 having associated therewith a guard member 129. Preferably, brush 128 comprises sections suitably connected for relative movement, one away from the other, when the brush is rotated. The brush may be similar to that disclosed in the patent of Charles H. Stubbs, for Tube coating brush, No. 1,863,950, issued June 21, 1932. Brushes of this type are known in the art and it is not thought necessary to illustrate or describe the brush in greater detail. Hose 113 extends through the tubular hub 121 of air turbine 119 and opens into the hollow coupling member 125 for delivering the coating liquid or paint thereto.

In Figure 1 we have shown fragmentarily, and in section, a boiler tube 130 to which is being applied a coating of paint or other protective liquid by a machine in accordance with our invention. The machine is suitably supported adjacent one end of the boiler and the air turbine 119 and brush 128, and associated parts are inserted into tube 130 and moved therethrough so as to position the brush 128 at the other end of the tube. During this operation, air hose 112 and the hose 113 are unwound from reel 2 and are drawn through the tube 130, it being noted that at this time reel 2 is declutched from the driving motor therefor and may be rotated by pull exerted upon the hose 112. During this rotation of the reel, shaft 24 is rotated and serves to move block 26 and guide member 27 from the left end of the reel, as viewed in Figure 1, toward the right end thereof. The operator then takes a position which will enable him to observe to best advantage the progress of the coating operation, this being permitted by the provision of the cable 97 and associated parts. Preliminary to initiation of the coating operation, the motor switch 93 is, of course, closed. This sets the motor 6 in operation, but does not affect the reel 2 so long as sprocket 9 remains declutched from clutch member 11. The operator then actuates the control switches 101, 102, thereby operating the electromagnetic valves 61 and 83, respectively, so that air is supplied under pressure to the turbine for rotating the brush and the coating liquid or paint is supplied by hose 113 to the coupling member 125. Control switch 103 is then operated, thus energizing electromagnet 20 and clutching sprocket 9 to clutch member 11. Since motor 6 is a constant speed motor, the reel 2 is driven at a constant speed and the brush 128, while being rotated by turbine 119, is drawn through the tube 130, lengthwise thereof, at a predetermined uniform rate. The coating liquid or paint is supplied to the surface of the tube to be coated in advance of the brush 128 and is spread by the latter evenly and uniformly over the tube surface. The size of the passages 126 of coupling member 125 is determined by the character of the paint or coating liquid used, and this liquid is supplied to the coupling member under constant predetermined uniform pressure. It will also be observed that the air for driving the turbine is supplied thereto under predetermined uniform pressure so that the speed of rotation of the brush 128, and the rate of its movement lengthwise of the tube, both bear a definite relation to the amount of coating liquid supplied to the surface of the tube and the rate at which this coating liquid is supplied. This assures that the coating liquid will be applied to the surface of the tube so as to form thereon a uniform coating C of uniform thickness predetermined in accordance with the character of the coating liquid used, the condition of the tube and the conditions of use thereof, etc. A further advantage is that it assures a continuous coating of the tube surface, this coating being of uniform thickness and of a predetermined thickness most efficient for protecting the tube in view of the conditions of use thereof. Experience has demonstrated that it is of vital importance in protecting tubes from corrosion and other injurious effects incident to use of the tubes, that the protecting coating be applied to the tube uniformly and that the entire tube surface be covered with certainty. It is also desirable that the thickness of the coating be such as to assure most efficient protection of the tube surface, which may depend largely upon the condition of the tube and the conditions of its use. By varying the relation between the pressure under which the paint or coating liquid is supplied to the coupling member 125, and the rate at which the brush is moved lengthwise through the tube, or the speed of rotation of the brush, or by providing coupling members having passages 126 of different sizes, the thickness of the coating applied to the tube can be varied, within limits, as required.

As the turbine reaches the end of the tube adjacent the machine, the control switches may be operated to stop the supply of paint or coating liquid first, to declutch motor 6 from reel 2, and to cut off the supply to hose 112 and stop the turbine 119, in the order named. This completes the coating operation and the tubes of the boiler may be coated successively in the manner above described. This coating operation may be performed by one man and is effected at relatively high speed, while having the advantage that it assures relative movement between the coating brush and the tube lengthwise of the latter at uniform speed, since the reel 2 is driven at uniform speed, and assures that the coating is applied to the tube surface throughout the entire area thereof and is of predetermined uniform thickness.

What we claim is:

1. In means for supplying coating liquid and operating pressure fluid to a device for coating tubes with liquid, a reel, means for driving said reel at constant speed, a hose structure windable onto and off of said reel comprising an outer flexible hose and an inner flexible hose, means for supplying fluid under pressure to said outer hose, and means for supplying liquid under pressure to said inner hose.

2. In means for supplying coating liquid and operating pressure fluid to a device for coating tubes with liquid, a reel, means for driving said reel at constant speed, a hose structure windable onto and off of said reel comprising an outer flexible hose and an inner flexible hose, means for supplying fluid under pressure to said outer hose, means for supplying liquid under pressure to said inner hose, and remote control means for controlling rotation of said reel and supply of fluid and liquid to the respective hose.

3. In hose and reel means of the character described, a reel provided with two separate lengthwise passages extending outward beyond one end thereof and disposed concentric with the axis of said reel, the latter being further provided with two separate concentric radial passages respectively communicating with said lengthwise passages, and a hose structure windable onto and off of said reel comprising an inner hose connected to the inner one of said radial passages and an outer hose connected to the outer one of said radial passages.

THOMAS E. PURCELL.
IRA E. CHURCH.

CERTIFICATE OF CORRECTION.

Patent No. 2,191,728. February 27, 1940.

THOMAS E. PURCELL, ET AL.

It is hereby certified that error appears in the above numbered patent requiring correction as follows: In the heading to the printed specification, line 6, and in the heading to the drawings, Sheets 1, 2 and 3, filing date of original application, for "September 17, 1935" read October 16, 1935; page 1, first column, lines 42 and 43, for "March 28, 1938" read March 22, 1938; and that the said Letters Patent should be read with this correction therein that the same may conform to the record of the case in the Patent Office.

Signed and sealed this 2nd day of April, A. D. 1940.

(Seal)

Henry Van Arsdale,
Acting Commissioner of Patents.